United States Patent
Miller et al.

(10) Patent No.: US 6,570,333 B1
(45) Date of Patent: May 27, 2003

(54) METHOD FOR GENERATING SURFACE PLASMA

(75) Inventors: Paul A. Miller, Albuquerque, NM (US); Ben P. Aragon, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 10/061,408

(22) Filed: Jan. 31, 2002

(51) Int. Cl.⁷ .................................................. H01J 7/24
(52) U.S. Cl. ............................ 315/111.21; 315/111.51; 156/345.48; 244/130; 118/723 I
(58) Field of Search ........................ 315/111.21, 111.51, 315/111.41, 111.71; 156/345.48; 244/205, 204, 130; 118/723 I, 723 R

(56) References Cited

U.S. PATENT DOCUMENTS

| | | | |
|---|---|---|---|
| 5,387,842 A | 2/1995 | Roth et al. .............. | 315/111.21 |
| 5,414,324 A | 5/1995 | Roth et al. .............. | 315/111.21 |
| 5,650,032 A | 7/1997 | Keller et al. ................. | 156/345 |
| 5,669,583 A | 9/1997 | Roth .......................... | 244/130 |
| 5,797,563 A | 8/1998 | Blackburn et al. .......... | 244/130 |
| 5,897,713 A * | 4/1999 | Tomioka et al. .......... | 118/723 I |
| 5,907,221 A * | 5/1999 | Sato et al. .............. | 315/111.51 |
| 6,200,539 B1 * | 3/2001 | Sherman et al. .............. | 216/67 |
| 6,247,671 B1 * | 6/2001 | Saeks et al. ................. | 244/205 |
| 6,350,647 B2 * | 2/2002 | Sakao .................... | 156/345.48 |
| 6,507,155 B1 * | 1/2003 | Barnes et al. ............ | 315/111.51 |

* cited by examiner

*Primary Examiner*—Don Wong
*Assistant Examiner*—Ephrem Alemu
(74) *Attorney, Agent, or Firm*—Elmer A. Klavetter

(57) ABSTRACT

A method for generating a discharge plasma which covers a surface of a body in a gas at pressures from 0.01 Torr to atmospheric pressure, by applying a radio frequency power with frequencies between approximately 1 MHz and 10 GHz across a plurality of paired insulated conductors on the surface. At these frequencies, an arc-less, non-filamentary plasma can be generated to affect the drag characteristics of vehicles moving through the gas. The plasma can also be used as a source in plasma reactors for chemical reaction operations.

20 Claims, 3 Drawing Sheets

(i)  (ii)  (iii)

METHOD FOR GENERATING SURFACE PLASMA

This invention was made with Government support under Contract No. DE-AC04-94AL85000 awarded by the Department of Energy. The Government has certain rights in the invention.

BACKGROUND OF THE INVENTION

The invention describes a method for covering the surface of a structure with a discharge plasma and, more particularly, methods of use of such plasma (1) to cover the surface of a body to affect the aerodynamic properties of the body by decreasing or increasing the drag of the body, and (2) to provide a plasma medium inside a plasma reactor used for treatment of work pieces, including semiconductor wafers used for fabrication of microelectronic devices.

The term "plasma" usually describes a partially ionized gas composed of ions, electrons and neutral species. This state of matter can be produced by the action of either very high temperatures, or strong direct current (DC) or an alternating current, such as by a radio frequency (RF) electric field. Stars, nuclear explosions and electric arcs represent high temperature or "hot" plasmas. Free electrons that are energized by an imposed DC or RF electric field and then collide with neutral molecules produce glow discharge plasmas. These neutral-molecule collisions transfer energy to the molecules and form a variety of active species which can include photons, excited atoms, metastables, individual atoms, free radicals, molecular fragments, monomers, electrons and ions.

Low power plasmas, such as dark discharges and coronas, have been used in the surface treatment of various materials. Because of their relatively low energy content, corona discharge plasmas can alter the properties of a material surface without damaging the surface.

Glow discharge plasmas represent a type of relatively low power density plasma. These glow discharge plasmas can produce useful amounts of visible and ultraviolet (UV) radiation. Glow discharge plasmas have the additional advantage therefore of producing visible and UV radiation in the simultaneous presence of active species.

In recent years, investigators have suggested that creating weak ionization, i.e., low-density non-equilibrium plasma, in from of aerodynamic vehicles can reduce drag. It is known that preheating a layer of air in front of vehicles can reduce drag, but such heating is generally considered energetically unfavorable. Blackburn et al. (U.S. Pat. No. 5,797,563, issued on Aug. 25, 1998) describe a method for increasing the aerodynamic and hydrodynamic efficiency of a vehicle by radiating tuned microwave electromagnetic energy outwardly form a vehicle.

The effect due to weak ionization can require much less energy than preheating the air. Drag reduction aerodynamic vehicles, particularly for supersonic vehicles at high altitudes, can be economically important even if drag is reduced by only a few percent. Roth (U.S. Pat. No. 5,669,583, issued on Sep. 23, 1997) describes a method and apparatus for using uniform glow discharge plasma to cover vehicles at approximately atmospheric pressure to control drag characteristics. Roth's method utilizes applied frequencies from below RF to the very lower regions of RF, where RF frequencies are generally defined to be in the range of 10 kHz to 300,000 MHz.

For many years, plasmas have been used for etching and deposition of surface layers, such as in the fabrication of microelectronic and optoelectronic devices. The surface modification is caused by the fluxes of electrons, ions, neutrals, and radicals that leave the plasma and impact and react with the surface of the work piece. Because the chemistry and physics of surface modification is complex, it is advantageous to have separate control of the plasma density and the ion energies in order to optimize the processes.

Early plasma reactors formed plasma by applying RF potentials between the work piece and an opposing electrode. These early designs did not provide separate control of the plasma density and ion energies. Subsequently, inductively coupled plasma sources were developed for use in the microelectronics industry (e.g., U.S. Pat. No. 5,650,032, issued on Jun. 27, 1997). These plasma reactors generally use an induction coil powered by a first RF power supply to control the plasma density and a second, capacitively coupled RF power supply, to energize the work piece and control the ion energies.

DESCRIPTION OF SPECIFIC EMBODIMENTS

Figure 1:
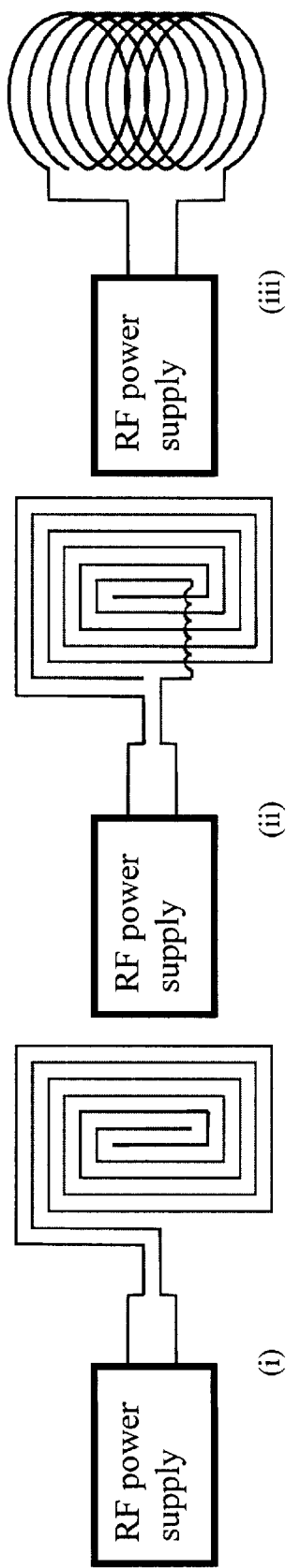
FIG. 1 illustrates three schematic wiring diagrams that can be used in the method of the present invention.

The present invention provides a method for covering a surface with discharge plasma. The plasma can be formed in air or in other gases at pressures from above atmospheric pressure (approximately 800 Torr) to pressures as low as 0.0080 Torr. These other gases in which a discharge plasma can form include, but are not limited to, the noble gases, such as helium, neon and argon, as well as the wide variety of gases used in the semiconductor industry, such as chlorine, hydrogen bromide, silane, carbon tetraflouride, $NF_3$, boron trichloride, Freon, sulphur hexaflouride, hydrogen, deuterium, nitrogen, ammonia, germane, dichlorosilane, nitrous oxide, $C_2F_6$, $C_4F_8$, tetraethosiloxane, oxygen, fluorine, carbon monoxide, carbon dioxide, water, hydrogen fluoride, and hydrogen chloride. The plasma can be applied to the surface of a vehicle (either a flat or curved surface) designed for movement in the air (such as an aircraft) on the water (such as a ship) or on the ground (such as a car or truck), or to an interior surface of a plasma reactor designed for modification or the surface or near-surface properties of a work piece, such as a semiconductor wafer.

Plasma sources are used in plasma reactors for fabrication of microelectronic devices. The physical and chemical reactions and energetic species (ions) generated in the plasma etch and deposit features that form the microelectronic devices. Early plasma reactors used one RF power source to generate plasma in a reactor configured as a capacitively coupled reactor. Plasma ions flowed from the plasma to the work piece, at rates and energies determined by the single source. In recent years, inductively coupled plasma sources have been adopted for many applications. They are advantageous because they allow use of one power source to generate the plasma by means of inductive coupling of RF power into the plasma, and a separate power source, connected to the work piece, to extract ions from the plasma. This separation of the plasma-generation and ion-extraction functions improves the ability to control the fabrication process in the reactor. The surface plasma source of the present invention provides an alternative to the inductively coupled source. The surface plasma source is advantageous because it operates at much lower current than inductively coupled sources, thereby reducing resistive losses and increasing electrical efficiency. It also provides different excitation of the plasma, which gives process designers an alternative that can be advantageous to any particular process, depending on the specific chemistry involved.

In the method of the present invention, radio-frequency (RF) power is applied across pairs of insulated conductors in contact with a surface, either on its outer surface, on an inner surface, or embedded just beneath the surface. The conductors form an array of twin lead transmission lines which, when the RF power is applied to the conductors in a gaseous environment, generate plasma in the gas surrounding the conductors. The transfer of energy from the transmission lines to the plasma occurs primarily through the action of the electric fringe fields that extend into the gas. The magnetic field due to the flow of current through the conductors aids coupling energy to the plasma. Under the conditions of application in the present invention, the plasma generated is non-filamentary and arc-less. The pairs of insulated conductors are generally disposed as adjacent strip electrodes that are spaced from and generally parallel to each other. The adjacent strip electrodes are connected to opposite poles of the RF power source. The application of the method of the present invention, when used on leading surfaces of a vehicular body, such as an aircraft, ship or terrestrial vehicle, in which the strip electrodes would be applied to the outer skin of the vehicle to generate a discharge plasma on the exterior of the vehicle, can improve the vehicle drag characteristics and therefore efficiency of movement. The discharge can also be applied in small regions of the aircraft surface to change the drag in a manner that is non-symmetric about the axis of the vehicle, and thereby serve as a non-moving control surface. The discharge can also be applied to regions at the entrance, interior, or exhaust regions of a jet engine, thereby modifying the airflow to improve propulsion performance.

The applied RF power in the present invention has an oscillation frequency of at least approximately 1 MHz and generally less than approximately 10 GHz with the power supplied dependent on the particular application. RF power at these frequencies allows generation of plasma that is arc-less (arc-free) and non-filamentary, providing more effective and uniform plasma. When such a layer of plasma is applied to a moving vehicle, such as an aircraft, ship or car, the aerodynamic characteristics of the atmospheric boundary layer are improved and a reduction in drag results. This is accomplished by reducing the level of boundary layer turbulence, by suppressing the formation of turbulent vortices, and by weakening the shock in front of the vehicle. When such plasma is used in a plasma reactor, it provides an ionized medium in which chemical reactions occur and from which ionized and neutral species can be extracted for modification on surface and near-surface properties of a work piece.

There are advantages to using the high RF frequencies (greater than approximately 1 MHz) of the present invention. At these high frequencies, lower electrical fields and potentials can be used to obtain the same current flow in the plasma compared to operation at lower frequencies. Lower potentials and fields are technologically advantageous, allowing for more compact and reliable power sources and power transmission cables. Additionally, at higher frequencies, the plasma ionization does not die out significantly during a half cycle of excitation, so that reionization of the plasma in the subsequent half cycle requires less electric field. This effect is separate from the first effect, but it also allows operation with lower electric fields and potentials.

The electrical conductors in the surface plasma source of the present invention are electrically separated from the plasma by a surrounding insulating layer or coating. The current that the conductors of the source cause to flow in the plasma provides the power that maintains the plasma. That current must flow through the insulators in the form of time-varying electric fields, known as displacement current, to provide continuity of current flow. Those insulators constitute electrical capacitors connected in series with the plasma and the insulators limit the flow of current in the plasma. The displacement current I is related to the insulator capacitance C and the excitation potential V by I=C dV/dt. In the method of the present invention, the current level in the plasma needed for any application can be achieved by operation with higher frequency (smaller dt) and lower potential (V) than can be achieved by the method of Roth (U.S. Pat. No. 5,669,583, issued on Sep. 23, 1997).

At low frequencies with high potential, the plasma generated by each current pulse will decay away rapidly before the next pulse due to recombination or diffusion losses of electrons and ions. Those loss rates are very high in atmospheric-pressure molecular gases, such as air: dissociative attachment and recombination lifetimes are typically less than one microsecond. Consequently, each current pulse is effectively a first pulse in a gas without preionization, and thus strong electric fields and high potentials are required. In contrast, a plasma source operating at the higher frequencies of the present invention provides plasma that does not decay away between half cycles. Thus, a new discharge does not have to be initiated during each half cycle provided that a half-cycle duration is comparable to or less than several microseconds.

There is no fundamental upper bound to the frequency of operation of the plasma source in the method of the present invention. However, to use simple, inexpensive, and efficient means to generate the power for our plasma source, and to use low-loss transmission lines (less cumbersome than wave guides) to distribute the power, the practical upper frequency limit for the source in the method of the present invention is approximately 10 GHz.

In any practical implementation, there inevitably will be some leakage of radiation away from the surface generating the plasma (such as a vehicle). Such radiation is undesirable (1) because it would constitute a waste of power, (2) because it might cause interference with electronic devices and communications services (terrestrial, airborne, or space-based), and (3) because, in military applications, it could provide a signal useful for targeting by adversaries. If the pairs of conductors in the plasma source are designed symmetrically, the power loss due to RF radiation will be insignificant. However, the plasma density will rise and fall during each half cycle, which will give rise to plasma modulation at twice the excitation frequency. Consequently, some radiation leakage at both the excitation frequency and its second harmonic can occur. Because of this possible leakage of radiation, operation of the method of the present invention should be at one of the frequencies designated by the Federal Communication Commission and other international organizations for operation of industrial apparatus. These frequencies include 13.56 MHz and 2.45 GHz, frequencies at which many manufacturers provide efficient and inexpensive power sources. The method of the present invention has been demonstrated to have efficient, trouble-free operation at frequencies utilized in industrial operations, including, but not limited to approximately 5, 10, 13.56, 23, 43, 52, and 80 MHz. For military aircraft, missile, or spacecraft applications, the lower frequencies can be preferable because accurate targeting by adversaries would require larger antenna structures (due to the longer wavelength) than are suitable for installation on compact aircraft and missiles. Another benefit of lower frequencies is that leakage radiation will be lower because the dimensions of the plasma source will be a smaller fraction of a wavelength and, thus, the plasma source will be an even less efficient radiator.

Figure 2:
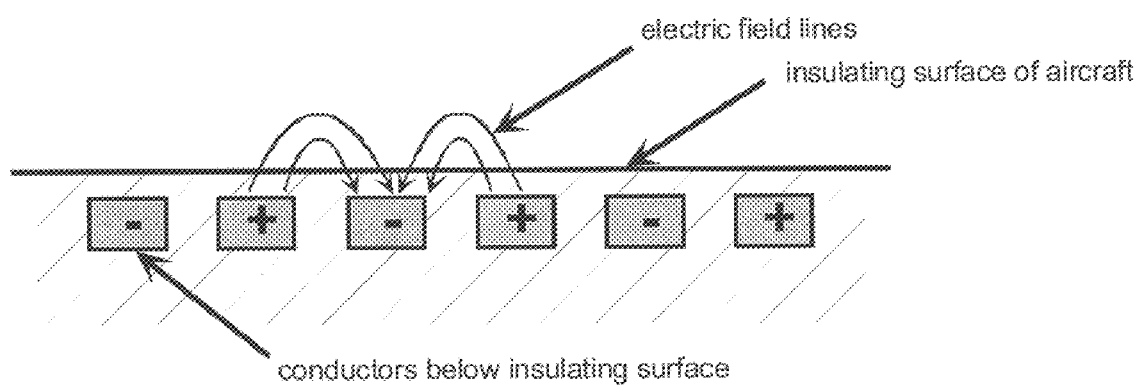
FIG. 2 illustrates the use of the method on an aircraft surface.
Figure 3:
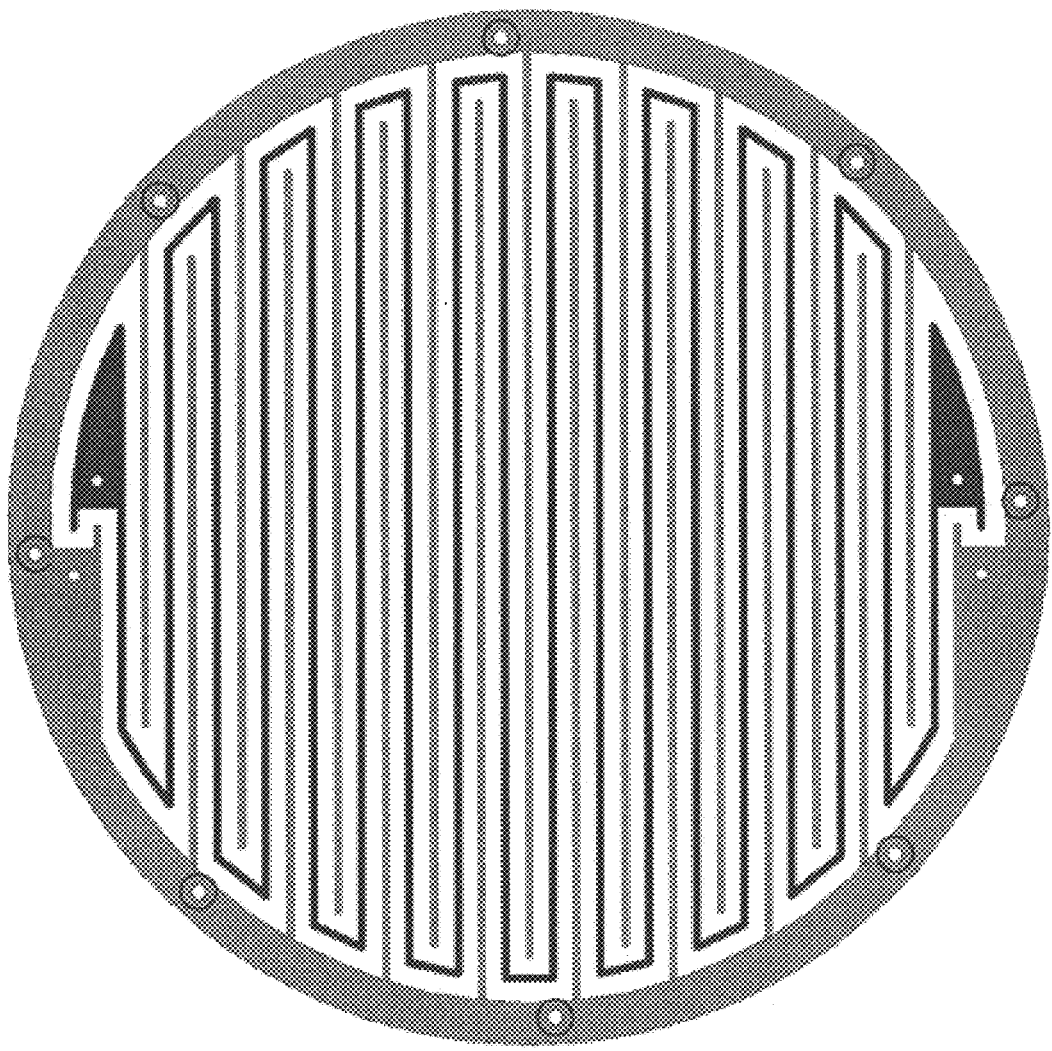
FIG. 3 illustrates a flat conductor layout for use on an electrode in a plasma reactor for processing microelectronic devices.

Various geometries of the array of insulated conductors can be utilized in the method of the present invention. FIG. 1 shows three different schematic wiring diagrams showing ways to energize the insulated conductors that are used to form the surface plasma source. In arrangement A of FIG. 1, the RF power is fed in a simple traveling wave. Consequently, the traveling wave decreases in amplitude as the wave propagates. In arrangements, B and C, power is applied at opposite ends of the conductor pair. This decreases, but does not eliminate, the effect of wave attenuation. These latter arrangements have been shown in experimental tests to perform better that the simple traveling wave system. In either arrangement, the area of the source can be increased by either increasing the length of the conductors or by connecting several similar assemblies in parallel. FIG. 2 shows an implementation suitable for use on an aircraft surface. FIG. 3 shows another geometry suitable for use in a reactor that processes microelectronic circuits.

FIG. 2 shows on embodiment of the method of the present invention as applied to an aircraft. Conductors biased with alternating phases of RF power are embedded in an insulating material that covers a surface of an aircraft. Electric field lines that extend into the gas above the surface cause ionization in the gas, thereby forming plasma. The schematic shows the conductors' polarity and simulated electric field lines at one instant in time.

By turning the plasma on and off, and varying the intensity of the plasma through the input power density and the applied RF voltage, it is possible to vary the drag coefficient of an aircraft from the normal value without the plasma layer, to values that can be much lower than those normally encountered. The plasma would tend to be swept along with the aerodynamic boundary layer flow, and would tend to accumulate in areas of stagnation or in vortices, thus making these aerodynamically drag-producing structures subject to an electric field, which can be manipulated by auxiliary or control electrodes on the surface of the aircraft.

In addition to reducing the drag and manipulating the geometry and position of vortices and areas of stagnant airflow, the boundary layer can be either speeded up or slowed down by producing traveling electrostatic peristaltic waves along the direction of movement of the aircraft. To accomplish this, the surface of the aircraft is covered with a series of insulated strip electrodes, oriented perpendicular to the normal aerodynamic flow of the boundary layer gases over the aircraft. These strip electrodes can then be energized in sequence, to induce the generation of peristaltic plasma waves along the surface of the aircraft. When such peristaltic waves are generated from front to back on the aircraft, they exert an acceleration of the plasma in the boundary layer, thus making the flow more laminar, and discouraging the formation of vorticity. On the other hand, if such waves are generated from back to front on the aircraft, then the action would work against the aerodynamic flow and could increase the drag on the aircraft, thus producing a braking effect on the motion of the aircraft though the atmosphere. Thus, the peristaltic waves can be used to either accelerate or decelerate the aircraft.

Various elaborations of this plasma-related boundary layer control are also possible. For example, the surface of the aircraft or vehicle can be fitted with a series of parallel insulated electrodes, the contours of which are perpendicular to the most laminar and least turbulence-producing boundary layer flow over the aircraft, as determined by wind tunnel tests. Phased excitation of these contoured parallel insulated electrodes could provide a body force accelerating the boundary layer flow over the aircraft in a direction that is least likely to lead to turbulence and vortex formation. Such manipulation of the boundary layer by electrostatic body forces can, in addition, have the effect of raising the Reynolds number for transition to turbulent flow both locally, and for the aircraft or vehicle as a whole. If no peristaltic effect is desired, then the electrodes can be oriented in any suitable direction on the aircraft, and all powered simultaneously to create uniform steady-state plasma.

The pairs of conductors (electrodes) should be arranged in parallel strips on the surface of the aircraft or other vehicle with adjacent strips being operated at radio frequency voltages 180° out of phase with each other. The width of the individual strip electrodes should be wide enough to create a uniform plasma layer over the surface of the vehicle. The strip electrodes can be oriented on the surface of the vehicle as a matter of convenience, in a quasi-parallel pattern, or the electrodes can be placed parallel or perpendicular to the velocity vector of the gas in the boundary layer flowing over the surface of the vehicle. The width of the individual strip electrodes can be adjusted over the surface of the aircraft, in such a way as to produce dense plasma where it is most needed, and more rarified plasma where that is satisfactory for the intended application of the plasma layer.

In addition, the plasma can be generated on the surface of a body, such as an aircraft, to prevent the formation of ice and to remove ice present on the body. The discharge plasma can also be generated on the surface of a body, such as a vehicle at night or in low visibility conditions, to make the body more visible.

The connections from the electrodes to the RF power should be made through an impedance matching network, the function of which is to minimize the reactive power in the RF circuit. Such a network can broaden the range of operating frequency and other parameters over which the desirable non-filamentary glow discharge is observed. The parameters of such a matching network are adjusted for the most stable, uniform operation of the glow discharge. This condition can occur when the reactive power of the plasma reactor is minimized.

In one embodiment, an array of paired insulated conductors was formed around the surface of a 1.5-inch diameter, 4.5-inch long cylinder inside a vacuum chamber that was back-filled with nitrogen gas at 0.3 Torr. RF power was at 20 W at 23 MHz and a uniform, non-filamentary, arc-less plasma was generated. In another embodiment using the same geometry and power, similar plasma was generated in 20 Torr argon.

In another embodiment, an array of paired insulated conductors was applied to a nosecone shape, with the cone being approximately 3 inches in length and 1.5 inches in diameter. Uniform, arc-free, non-filamentary plasmas were generated by application of 20 W of RF power at 36 MHz in 1 Torr nitrogen and by application of 200 W of RF power at 36 MHz in 10 Torr nitrogen.

In another embodiment, using the same nosecone geometry, a uniform, arc-free, non-filamentary plasma was generated by application of 180 W of RF power at 36 MHz at 8 Torr air pressure, approximately equivalent to the air pressure at 100,000 ft above the earth's surface.

In another embodiment, conductors were formed in a serpentine pattern as shown in FIG. 3. The conductor was cast inside layers of potting compound and energized at 13.56 MHz to form uniform planar plasma suitable for use in a plasma reactor. Insulating layers such as Kapton, potting compound, and fused silica are suitable coverings for the conductors for different applications, depending on power levels and material compatibility with the gas species in the plasma.

In another embodiment, a discharge plasma was generated in argon at a pressure of only 0.008 Torr.

In each of these embodiments, plasma was generated that extended several centimeters beyond the surface. The plasma sources operated successfully at power levels from 0.1 to 10 W/cm$^2$, depending on gas species and pressure.

The invention being thus described, it will be obvious that the same can be varied in many ways. Such variations are not to be regarded as a departure from the spirit and scope of the invention, and all such modifications as would be obvious to one skilled in the art are intended to be included within the scope of the following claims.

We claim:

1. A method for generating a discharge plasma which covers a surface of a body in a gas, comprising:

disposing adjacent to a surface of a body in a gas a plurality of paired insulated conductors, said paired insulated conductors forming an array of twin-lead transmission lines, wherein one lead of said twin-lead transmission lines serves as a first electrode terminal and the remaining lead of said twin-lead transmission lines serves as a second electrode terminal;

connecting said first electrode terminal to a first pole of a radio frequency power source which has first and second opposite poles, and connecting the second electrode terminal either to the second pole of said radio frequency power source or to a ground; and generating a discharge plasma which covers the surface of said body utilizing said radio frequency power source to energize said first electrode terminal relative to said second electrode terminal with a radio frequency driving voltage at a frequency greater than approximately 1 MHz.

2. The method of claim 1 wherein said frequency is greater than approximately 10 MHz.

3. The method of claim 1 wherein said frequency is less than approximately 10 GHz.

4. The method of claim 1 wherein said gas is selected from the group comprising air, helium, neon, argon, chlorine, hydrogen bromide, silane, carbon tetraflouride, NF$_3$, boron trichloride, Freon, sulphur hexaflouride, hydrogen, deuterium, nitrogen, ammonia, germane, dichlorosilane, nitrous oxide, C$_2$F$_6$, C$_4$F$_8$, tetraethosiloxane, oxygen, fluorine, carbon monoxide, carbon dioxide, water, hydrogen fluoride, and hydrogen chloride.

5. The method of claim 1 wherein said gas is at a pressure greater than approximately 0.008 Torr.

6. The method of claim 5 wherein said gas is at a pressure of less than approximately 800 Torr.

7. The method of claim 1 wherein said body is a vehicle.

8. The method of claim 1 wherein the discharge plasma which covers the surface of said body reduces the drag of said body in said gas.

9. The method of claim 7 wherein said vehicle is an aircraft.

10. The method of claim 7 wherein said discharge plasma is arc-less and non-filamentary.

11. The method of claim 1 wherein said array of twin-lead transmission lines is arranged in a cylindrical geometry.

12. The method of claim 1 wherein said array of twin-lead transmission lines is arranged in a serpentine winding geometry.

13. The method of claim 1 wherein said array of twin-lead transmission lines is disposed on a printed circuit board.

14. The method of claim 1 wherein said surface is flat.

15. The method of claim 1 wherein said surface is curved.

16. The method of claim 1 wherein said radio frequency power source is applied as a traveling wave.

17. The method of claim 1 wherein said radio frequency power source is applied to opposite ends of said array of twin-lead transmission lines.

18. The method of claim 1 wherein said radio frequency power source driving voltage and frequency is varied, thereby varying the intensity of the generated discharge plasma and varying the drag coefficient of said body.

19. The method of claim 1 wherein the discharge plasma is utilized in a plasma reactor.

20. The method of claim 1 wherein the discharge plasma is applied to surface regions of a jet engine, thereby modifying the airflow to improve propulsion performance.

* * * * *